(12) United States Patent
Doyle (10) Patent No.: US 12,316,497 B2
(45) Date of Patent: May 27, 2025

(54) ANALYSIS TOOL FOR SECURE ZERO TOUCH PROVISIONING ARTIFACTS

(71) Applicant: Arista Networks, Inc., Santa Clara, CA (US)

(72) Inventor: Eamon Doyle, Dublin (IE)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/487,803

(22) Filed: Oct. 16, 2023

(65) Prior Publication Data
US 2025/0126015 A1    Apr. 17, 2025

(51) Int. Cl.
*H04L 41/084* (2022.01)
(52) U.S. Cl.
CPC ................... *H04L 41/084* (2013.01)
(58) Field of Classification Search
CPC ..................................................... H04L 41/084
See application file for complete search history.

(56) References Cited

U.S. PATENT DOCUMENTS

| 12,050,582 B1* | 7/2024 | Aya | G06F 16/2282 |
| 2020/0213191 A1* | 7/2020 | Watsen | H04L 61/5014 |
| 2022/0386124 A1* | 12/2022 | Kb | H04W 12/06 |
| 2022/0405106 A1* | 12/2022 | Mandramoorthy | G06N 20/00 |
| 2023/0208652 A1* | 6/2023 | Kumar | H04L 9/3247 713/175 |

OTHER PUBLICATIONS

Watsen et al. "Secure Zero Touch Provisioning", https://www.rfc-editor.org/rfc/pdfrfc/rfc8572.txt.pdf (Year: 2019).*
K. Watsen et al., Secure Zero Touch Provisioning (SZTP), Internet Engineering Task Force (IETF), Apr. 2019, pp. 1-87, RFC Editor, United States.

* cited by examiner

*Primary Examiner* — James E Springer
*Assistant Examiner* — Patrick F Ngankam
(74) *Attorney, Agent, or Firm* — Treyz Law Group, P.C.; Tianyi He (57) ABSTRACT

A network device may receive encoded provisioning information from a source of provisioning information, such as a bootstrap server, as part of a provisioning operation. An analysis tool on a client device or on the network device may be configured to obtain the encoded provisioning information, parse the encoded provisioning information to obtain one or more decoded portions of the provisioning information, and output information resulting from the parsing operation, thereby providing insight into device provisioning information often encoded in a complex manner.

20 Claims, 7 Drawing Sheets

ANALYSIS TOOL FOR SECURE ZERO TOUCH PROVISIONING ARTIFACTS

BACKGROUND

This relates to a networking system, and more particularly, to a computing device configured to obtain network device provisioning information.

In one illustrative system, a network device can obtain the provisioning information as part of a device's self-provisioning operation. As an example, an initially un-provisioned network device may connect to a server from which the provisioning information is obtained.

DETAILED DESCRIPTION

A network can convey network traffic (e.g., in the form of packets, frames, etc.) between host devices. To properly route and forward the network traffic, the network can include a number of network devices configured with networking data such as forwarding decision data, routing decision data, network policy information, etc.

Network devices typically require provisioning to be operational within the network. To simplify the process of provisioning a network device for operation, the network device may initiate its own provisioning operation (sometimes referred to as a self-provisioning operation). The network device may, as part of the provisioning operation, obtain provisioning information such as one or more configuration artifacts (sometimes referred to as configuration information, configuration items, configuration content, or device provisioning content) and process the obtained one or more configuration artifacts to perform the self-provisioning operation. At the end of a successful self-provisioning operation, the network device may be configured with the appropriate configuration data (e.g., networking data, configuration parameters, state information, etc.) such that the network device may perform corresponding networking functions within the network.

The network device may obtain the provisioning information from one of many sources such as a network address assignment server, a removable storage device, and a bootstrap server, as just a few examples. Regardless of the source, the provisioning information may often be encoded with multiple layers of encoding (by the source) when conveyed to a network device. The layers of encoding may structure the provisioning information for use by the network device (e.g., may encode by structuring data into a preferred file structure or generally data structure), may encrypt the provisioning information (e.g., may encode by encrypting data), may assist in validation of the provisioning information (e.g., may encode by signing data with a specific entity's certificate, the signed data being later verifiable to be attributed to the entity), may otherwise secure (e.g., encrypt and/or sign) the provisioning information, and/or may serve a variety of other purposes. The receiving network device may decode (unencode) the encoded provisioning information before processing the content therein.

However, the often complex encoding of the provisioning information can lead to difficulties in diagnosing issues (e.g., bugs, errors, etc.) within the content of the provisioning information and/or the layers of encoding. As an example, a network device that receives encoded provisioning information may fail to complete a (self-) provisioning operation based on the received encoded provisioning information. Because the content decoded by the network device is often transient and logs of the provisioning operation often do not have sufficient information to pinpoint the issue, it may be difficult to diagnose and correct the issue(s) with the provisioning information and/or the issue(s) with the encoding of the provisioning information. This may cause delays in the development of the desired provisioning information (e.g., on a bootstrap server or other source).

Accordingly, it may be desirable to provide an analysis tool executing on one or more processors of a computing device that obtains encoded data, such as encoded provisioning information, and parses the encoded data to provide the content therein (e.g., functional pieces of content, which are sometimes referred to as artifacts, therein) and to provide diagnostic information associated with the parsing operation. The computing device may output any relevant information (e.g., the artifacts or pieces of decoded content, the diagnostic information, etc.) to a user to facilitate further analysis and/or troubleshooting of the encoded data.

Figure 1:
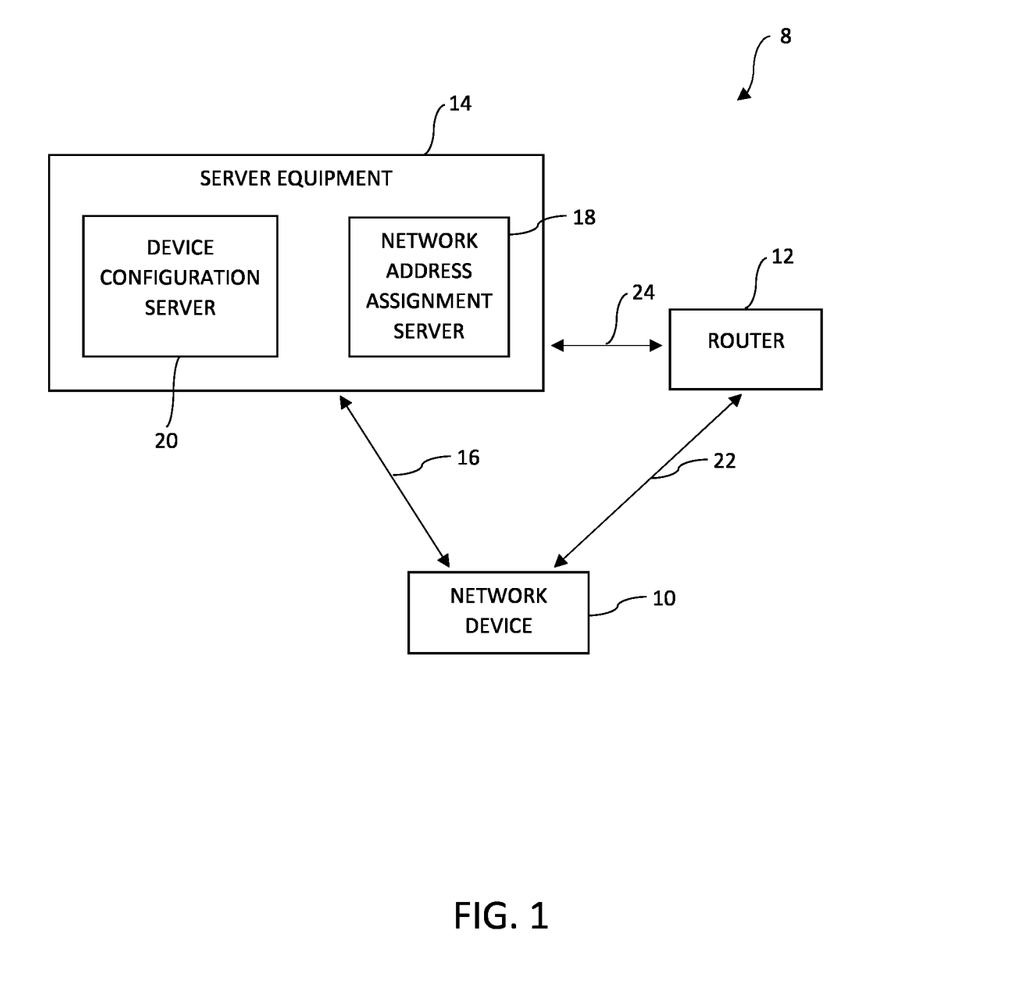
FIG. 1 is a diagram of an illustrative network in which a network device is configured to obtain device provisioning information in accordance with some embodiments.

The contexts and/or advantages described above are merely illustrative. If desired, any suitable system may employ the mechanism(s) described above and/or further detailed herein to improve the analysis of encoded data (e.g., impart the above-mentioned advantages and/or other advantages). An illustrative networking system in which a network device is configured to perform a device provisioning operation is shown in FIG. 1. In particular, FIG. 1 shows an illustrative network (portion) 8 which may be of any suitable scope and/or form part of a larger network of any suitable scope. As examples, network 8 may include, be, or form part of one or more local segments, one or more local subnets, one or more local area networks (LANs), one or more campus area networks, a wide area network, etc. Network 8 may include any suitable number of different network devices that connect corresponding host devices of network 8 to one another. At least some of these network devices may be connected by one or more wired technologies or standards such as Ethernet (e.g., using copper cables and/or fiber optic cables), thereby forming a wired network portion. If desired, network 8 may also include a wireless network portion extending from the wired network portion. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

In general, network devices in network 8 can include any number of switches (e.g., single-layer (L2) switches and/or multi-layer (L2 and L3) switches), bridges, routers, gateways, hubs, repeaters, firewalls, wireless access points, network devices serving other networking functions, network devices that include the functionality of two or more of these devices, management (controller) devices that control the operation of one or more of these network devices, and/or other types of network devices.

In the example of FIG. 1, the network devices of network 8 include at least network device 10, such as a multi-layer switch or another type of network device, and router 12. Network 8 may also include one or more host devices or host equipment such as server equipment 14. Configurations in which network device 10 is an un-provisioned network device (e.g., not a fully provisioned network device) when initially coupled or connected to other elements of network 8 are sometimes described herein as an illustrative example.

In these configurations, network device 10 may communicate with different portions of server equipment 14 via one or more communication paths 16 in an attempt to perform a network device provisioning operation that provisions and configures device 10 itself for operation. In particular, network device 10 may first communicate with a network address assignment server 18 implemented on server equipment 14 (e.g., a DHCP server such as server equipment implementing DHCPv4, implementing DHCPv6, implementing a variation of DHCP, implementing a server that is compatible with DHCP, and/or implementing other network address assignment protocols) to obtain a network address, or generally device interface configuration information, for network device 10. After obtaining its network address, network device 10 may generate one or more network interfaces based on the obtained device interface configuration information.

Network device 10 may further obtain device provisioning information such as configuration information (e.g., networking data, boot image information, etc.), executable files (e.g., compiled binary executable files, script-based executable files, etc.), and/or other device provisioning content from a source of provisioning information such as device configuration server 20 (sometimes referred to as bootstrap server 20 or device bootstrapping server 20). If desired, another source of provisioning information, such as network address assignment server 18 or a removable storage device (receivable at a port of network device 10), may be used instead of or in addition to bootstrap server 20.

Network device 10 may be considered fully provisioned and ready to perform networking operations (e.g., routing protocols, traffic routing, traffic forwarding, etc.) after successfully executing the obtained executable files such as compiled binary executable files and/or script-based executable files, storing the obtained configuration information (e.g., networking data, the boot image information, etc.), and/or generally processing the device provisioning content, as examples.

While both shown in FIG. 1 to be within server equipment 14, servers 18 and 20 may be implemented on distinct and separate pieces of server computing equipment (e.g., on different processing circuitry or sets of processors, using different storage circuitry accessible by the corresponding processing circuitry, on the same or different server racks, etc.) at server equipment 14 or may be implemented on shared computing equipment (e.g., the same processing circuitry or set of processors, using the same storage circuitry accessible by the processing circuitry, etc.) at server equipment 14. Servers 18 and 20 may be implemented at different sites or generally on different network portions of network 8 (e.g., on different local segments) or may be implemented at the same site (e.g., on the same local segment or different local segments).

Before, when, and/or after communicating with server equipment 14 as part of the device provisioning operation, network device 10 may be in communication with router 12 via one or more communication paths 22. As examples, router 12 may be a router on the same local segment or subnet as network device 10, server 18, and/or server 20, may be an edge router or gateway, may be a core router, may be a virtual router implemented on server equipment, or generally may be a router implemented in any suitable manner at any suitable location within network 8. Router 12 may be communicatively coupled to server equipment 14 (e.g., server 18 and/or server 20) via one or more communication paths 24.

Communication paths 16, 22, and 24 may be implemented using network paths of network 8. These network paths may include direct cable connections with or without intervening network devices. In other words, each path 16, each path 22, and/or each path 24 may span across portions of network 8 (e.g., one or more network devices therein) to provide the connectivity illustrated in FIG. 1. While shown in FIG. 1 as separate paths, paths 16, 22, and 24 may include paths or path portions that overlap one another.

In one illustrative arrangement, a given path 16 may be implemented by paths 22 and 24 and intervening router 12. In an arrangement where network device 10 lacks a direct connection to server equipment 14, any connection between network device 10 and server equipment 14 may include router 12 (e.g., serving as a relay device). In particular, router 12 may contain a relay agent executing on its processing circuitry to perform relaying of address assignment messages (e.g., DHCP messages) for network device 10 and server equipment 14 (or more specifically, server 18). This relaying of DHCP messages and/or other types of messages occurs prior to device 10 having or being assigned a network address and thus will differ from normal packet forwarding (e.g., forwarding of packets that identify the network address of device 10).

If desired, other routers and/or network devices (e.g., in addition to router 12) may also serve as relay devices to relay DHCP messages and/or other messages between device 10 and server equipment 14 (e.g., server 18). In general, any number of intervening (relay) devices (e.g., zero, one, two, etc.) at any suitable locations (e.g., along paths 16, 22, and/or 24) may be involved in the conveyance of messages such as network address assignment messages, or generally device configuration request and response messages as described herein, between network device 10 and server equipment 14 (e.g., between device 10 and server 18, between device 10 and server 20, etc.).

Figure 2:
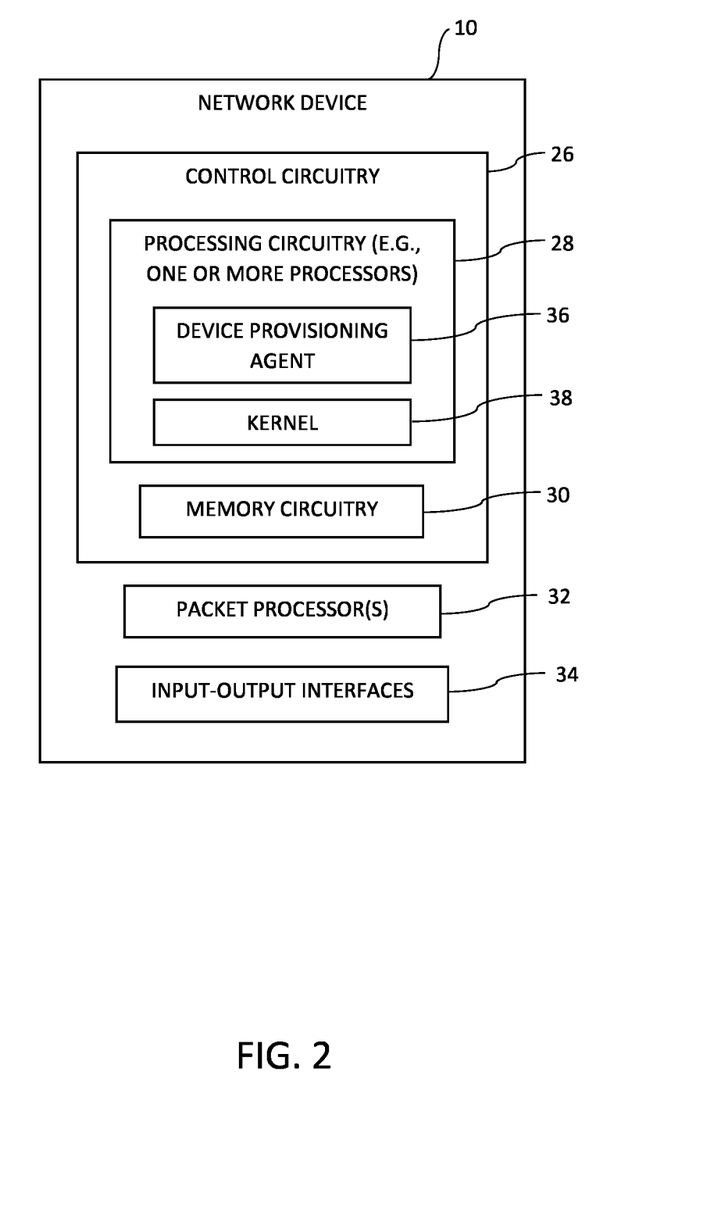
FIG. 2 is a diagram of an illustrative network device configured to perform a device provisioning operation in accordance with some embodiments.

FIG. 2 is a diagram of an illustrative network device such as network device 10 in FIG. 1. In some configurations described herein as an illustrative example, network device 10 may be an un-provisioned multi-layer switch or other type of network device that automatically initiates a device provisioning operation to provision itself after being introduced to network 8 in FIG. 1 (e.g., after being communicatively coupled to components of network 8 such as router 12 and/or server equipment 14).

As shown in FIG. 2, network device 10 may include control circuitry 26 having processing circuitry 28 and memory circuitry 30, one or more packet processors 32, and input-output interfaces 34 (e.g., network interfaces) provided within a housing and/or on a support substrate of network device 10. In one illustrative arrangement, network device 10 may be or form part of a modular network device system (e.g., a modular switch system having removably coupled modules usable to flexibly expand characteristics and capabilities of the modular switch system such as to increase the number of ports, provide specialized functionalities, etc.). In another illustrative arrangement, network device 10 may be a fixed-configuration network device (e.g., a fixed-configuration switch) having a fixed number of ports and/or a fixed hardware configuration.

Processing circuitry 28 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 28 may run (e.g., execute) a network device operating system and/or other software/firmware that is stored on memory circuitry 30. Memory circuitry 30 may include one or more non-transitory (tangible) computer-readable storage media that stores the operating system software and/or any other software code, sometimes referred to as program instructions, software instructions, software, data, instructions, or code. As examples, the device provisioning operation as described herein may be stored as (software) instructions on the one or more non-transitory computer-readable storage media (e.g., in portion(s) of memory circuitry 30 in network device 10). The corresponding processing circuitry (e.g., one or more processors of processing circuitry 28 in network device 10) may process or execute the respective instructions to perform the device provisioning operation.

Memory circuitry 30 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10), and/or other storage circuitry. Processing circuitry 28 and memory circuitry 30 as described above may sometimes be referred to collectively as control circuitry 26 (e.g., implementing a control plane of network device 10).

As other illustrative operations in addition to the device provisioning operation, processing circuitry 28 may execute network device control plane software such as operating system software, routing policy management software, routing protocol agents or processes, routing and/or forwarding information base agents, and other control software, may be used to support the operation of protocol clients and/or servers (e.g., to form some or all of a communications protocol stack such as the TCP/IP stack), may be used to support the operation of packet processor(s) 32, may store packet forwarding information, may execute packet processing software, and/or may execute other software instructions that control the functions of network device 10 and the other components therein. Some of these operations such as those associated with routing policy management software, routing protocol agents or processes, routing and/or forwarding information base agents, and packet processing software may occur after the device provisioning operation has been successfully completed.

Packet processor(s) 32 may be used to implement a data plane or forwarding plane of network device 10. Packet processor(s) 32 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 32 may receive incoming network traffic via input-output interfaces 34, parse and analyze the network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces (e.g., one or more Ethernet ports), optical interfaces, Bluetooth interfaces, Wi-Fi interfaces, and/or other network interfaces for connecting network device 10 to the Internet, a local area network, a wide area network, a mobile network, generally other network device(s) in these networks, and/or other computing equipment (e.g., host equipment such as server equipment, user equipment, etc.). As an example, at least some input-output interfaces 34 (e.g., those based on wired communication) may be implemented on physical ports (sometimes referred to as sockets). These physical ports may be configured to physically couple to and/or electrically connect to corresponding mating connectors of external components or equipment. Different ports may have different form-factors to accommodate different cables, different modules, different devices, or generally different external equipment. As another example, at least some input-output interfaces 34 (e.g., those based on wireless communication) may be implemented using wireless communication circuitry (e.g., antennas, transceivers, radios, etc.).

Still referring to FIG. 2, in configurations in which network device 10 is an initially un-provisioned network device, processing circuitry 28 on network device 10 may execute a device provisioning agent 36 (sometimes referred to herein as a device provisioning process 36) that helps manage and facilitate the device self-provisioning operation described herein after the initially un-provisioned device 10 is supplied with power and is communicatively coupled to router 12 and/or server equipment 14 (e.g., by having a network connection). If desired, this provisioning operation may be initiated automatically by executing agent 36 based on one or more criteria being met. The one or more criteria can include network device 10 being connected to a power source, network device 10 being coupled to one or more elements of network 8, network device 10 being coupled to a removable storage device, network device 10 lacking an initial configuration, network device 10 receiving one or more user inputs such as the pressing of a button, the providing of a key or other security element, or generally any specified input via a user interface, and/or other suitable provisioning criteria.

Configured in this manner, network device 10 may sometimes be referred to herein as a network device configured for secure zero touch provisioning, zero touch provisioning, one touch provisioning, or minimal touch provisioning. If desired, network device 10 (e.g., device provisioning agent 36) may operate in compliance with or in a manner compatible with the Secure Zero Touch Provisioning (SZTP) standard and/or other standards set forth by the Internet Engineering Task Force (e.g., in Request for Comments (RFC) 8572).

Processing circuitry 28 may also execute threads or tasks for a kernel such as kernel 38. Kernel 38 may, among other functions, implement network interfaces (e.g., interfaces 34 over physical ports) based on communication protocols (e.g., transport layer protocols, network layer protocols, data link layer protocols, etc.) and form corresponding communication sockets using device interface configuration information, thereby implementing a communication protocol stack (e.g., a TCP/IP stack) with which network device 10 can communicate with external equipment.

As part of the device provisioning operation, device 10 (e.g., device provisioning agent 36) may obtain the device interface configuration information such as the network address (e.g., IP address) of network device 10. Kernel 38 may use the obtained device interface configuration information to form one or more network layer interfaces (e.g., one or more IPv4 and/or IPv6 interfaces) for device 10.

Device provisioning agent 36 may subsequently communicate with device bootstrapping server 20 (FIG. 1) to obtain provisioning information such as configuration information (e.g., executable files, networking data such as routing and forwarding decision data, network policy information, etc., and generally other types of device provisioning content) via the network interfaces (e.g., interfaces 34) established by kernel 38.

Processing circuitry 28 may execute device provisioning agent 36 and kernel 38 by executing software instructions stored on memory circuitry 30. While device provisioning agent 36 and kernel 38 are described to perform respective parts of the device provisioning operation for provisioning device 10, this is merely illustrative. Processing circuitry 28 may be organized in any suitable manner (e.g., to have any other agents or processes instead of or in addition to device provisioning agent 36 and/or kernel 38) to perform each part of the device provisioning operation. Accordingly, control circuitry 26 and/or processing circuitry 28 may sometimes be described herein to perform the device provisioning operation instead of specifically referring to the one or more agents, processes, tools, and/or kernel executed by processing circuitry 28.

Figure 3:
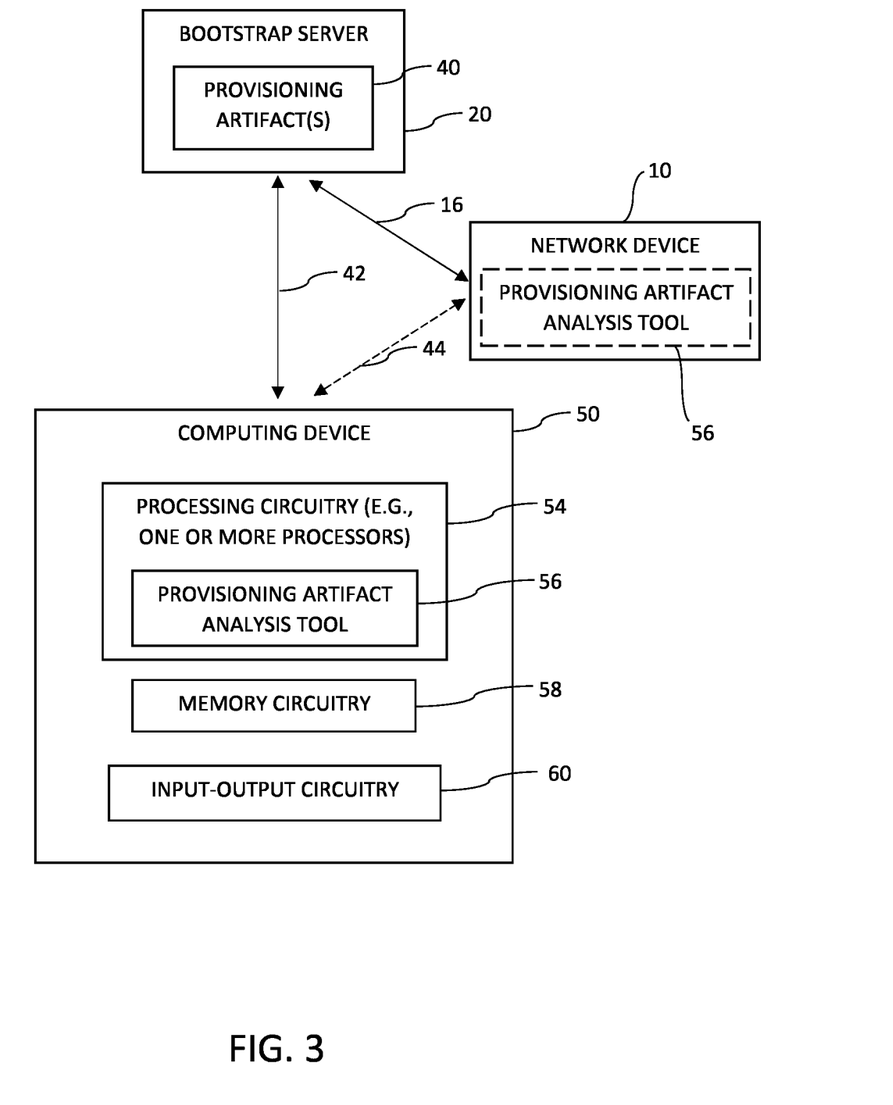
FIG. 3 is a diagram of an illustrative networking system having a source of encoded provisioning information and an analysis tool for the encoded provisioning information in accordance with some embodiments.

FIG. 3 is a diagram of an illustrative network device provisioning system in which a source of provisioning information such as bootstrap server 20 is communicatively coupled to network device 10 to provide network device 10 with one or more provisioning artifact(s) 40 (sometimes referred to herein as provisioning information 40 or device provisioning information 40). As described herein, provisioning information (e.g., bootstrapping data when in compliance with RFC 8572) generally refers to the various types of information conveyed to network device 10 to facilitate its provisioning operation. As examples, provisioning information may include redirect information, configuration artifacts (sometimes referred to herein as configuration information), and/or validation information for the redirect information and configuration artifacts.

A provisioning artifact 40 may refer to a piece of information or a collection of content usable for network device provisioning. As examples, a first provisioning artifact 40 may be a piece of conveyed information to be processed for the network device provisioning (e.g., conveyed information, such as onboarding information or redirect information, in compliance with RFC 8572), a second provisioning artifact 40 may be an ownership voucher (e.g., an ownership voucher in compliance with RFC 8572), and a third provisioning artifact 40 may be an owner certificate (e.g., an owner certificate in compliance with RFC 8572). While provisioning artifact(s) 40 are sometimes described herein to contain artifacts in compliance with RFC 8572, this is merely illustrative. Provisioning artifact(s) 40 may include other suitable types of artifacts (e.g., artifacts in compliance with other standards, artifacts compatible with RFC 8572 and/or other standards, customized artifacts having non-standardized structure and/or content, etc.), if desired.

Configuration artifacts as described herein may refer to a type of provisioning artifact 40 such as onboarding information (e.g., onboarding information in compliance with RFC 8572) or generally information that when successfully processed by the network device configures the network device for networking operation. As an example, configuration artifacts may include one or more (script-based or compiled binary) executable files (e.g., a pre-configuration script and/or a post-configuration script in compliance with RFC 8572) and/or configuration data (e.g., networking data, boot image information, configuration parameters, state information, etc.). Onboarding information may differ from redirect information (e.g., another type of provisioning artifact 40) in that when redirect information processed by the network device, the redirect information may generally facilitate the network device provisioning operation by redirecting network device to another source of provisioning artifact(s) (e.g., a source of onboarding information).

In the example of FIG. 3, device provisioning artifact(s) 40 should be written and more generally bootstrap server 20 should be developed to ensure that network device 10 can successfully complete its provisioning operation based on provisioning artifact(s) 40 received from server 20. Server 20 may generally convey provisioning information 40 in an encoded form (e.g., one or more provisioning files including encoded provisioning information such as encoded redirect information or encoded configuration artifact(s), and encoded validation information) to network device 10 over path 16. Server 20 may store encoded (or at least partially encoded) provisioning information for conveyance at a later time to network device 10 and/or may include encoders that encode the provisioning information (in real-time) as the provisioning information is being sent to network device 10.

The process of developing bootstrap server 20 may be error-prone not only because network device 10 expects (e.g., is configured to process) strictly formatted content but also because of the complex encoding applied to the provisioning information. Accordingly, issues may arise not only when the provisioning information includes errors but also when the layers of encoding are applied improperly. Due to the low visibility into network device 10 when processing (e.g., decoding) the received encoded provisioning information (e.g., one or more provisioning files containing encoded content for network device provisioning), it may be difficult to pinpoint the source of issues when a general indication of failed device provisioning is output by network device 10. As such, successful development of bootstrap server 20 may be hindered or at least delayed due to difficulties in identifying the source of issues. Similar issues may arise after development of bootstrap server 20 (e.g., during deployment when similar issues arise that cause bootstrap server 20 to be unable to properly provision un-provisioned network devices in the field).

Accordingly, the network device provisioning system of FIG. 3 may include a provisioning artifact analysis tool that parses encoded provisioning artifact(s) 40 for analysis and/or to provide greater visibility into the processing (e.g., decoding) of encoded provisioning artifact(s) 40 (e.g., simulate the type of processing that would have been performed by device provisioning agent 36 in FIG. 2). The provisioning artifact analysis tool may sometimes be referred to as a provisioning artifact analysis utility, a provisioning artifact test tool, or a provisioning artifact test utility. When specifically used to operate on provisioning artifact(s) in compliance with Secure Zero Touch Provisioning (SZTP, as specified by RFC 8572), the analysis or test utility may sometimes be referred to as a SZTP (test) utility.

In one example illustrated in FIG. 3, an illustrative provisioning artifact analysis tool such as analysis tool 56 may be implemented on computing device 50. In particular, computing device 50 may include processing circuitry 54, memory circuitry 58, and input-output circuitry 60, among other components.

Processing circuitry 54 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 54 may run (e.g., execute) a computing device operating system and/or other software/firmware that is stored on memory circuitry 58. Memory circuitry 58 may include one or more non-transitory (tangible) computer-readable storage media that stores the operating system software and/or any other software code, sometimes referred to as program instructions, software instructions, software, data, instructions, or code. As examples, the operations performed by provisioning artifact analysis tool 56 as described herein may be stored as (software) instructions on the one or more non-transitory computer-readable storage media (e.g., in portion(s) of memory circuitry 58 in computing device 50). The corresponding processing circuitry (e.g., one or more processors of processing circuitry 54 in computing device 50) may process or execute the respective instructions to perform the operations of provisioning artifact analysis tool 56.

Memory circuitry 58 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 50), and/or other storage circuitry. Processing circuitry 54 and memory circuitry 58 as described above may sometimes be referred to collectively as control circuitry for computing device 50. The control circuitry of device 50 may control the operation of other components such as components of input-output circuitry 60.

Input-output circuitry 60 may include one or more input-output devices configured to receive user input and/or to supply a user with output (user output). As examples, these one or more input-output devices may include one or more displays (e.g., an integrated display or an external monitor, a touchscreen display, a touch-insensitive display, etc.), other types of light-emitting devices, an integrated or external keyboard, an integrated or external touchpad or trackpad, a mouse, other types of keys, buttons, or wheels, and/or any other devices configured to receive user input and/or supply user output.

Input-output circuitry 60 may include interface circuitry through which internal components (e.g., processing circuitry 54, memory circuitry 58, etc.) may interface and communicate with external equipment such as bootstrap server 20, network device 10, and/or one or more external input-output devices. As examples, the interface circuitry may include physical ports (e.g., in which external connectors coupled to server 20, device 10, and/or external input-output devices are received to facilitate communication therebetween), may include wireless communication circuitry (e.g., antennas, transceivers, radios, etc.) to facilitate communicative coupling to server 20, device 10, and/or external input-output devices, and may include encoders and/or decoders (e.g., circuits that encode/decode data for conveyance across wired and/or wireless mediums, circuits that encode/decode data by structuring data to be in compliance with one or more different file structures, circuits that encode/decode data by encrypting/decrypting data, circuits that encode by signing (encrypting) data with an entity key, circuits that decode by decrypting and verifying the signature or signing entity, etc.). While the interface circuitry is described as part of input-output circuitry 60, which is shown as being separate from processing circuitry 54, this is merely illustrative. If desired, some portions of the interface circuitry (e.g., at least circuitry that perform higher-level encoding and decoding functions such as structuring data to be in compliance with one or more different file structures, encrypting/decrypting data, signing data, verifying signature of signed data, etc.) may be implemented by (portions of) processing circuitry 54.

Device 50 may be or form part of any suitable type of computing equipment such as a desktop computer, a laptop computer, a tablet computer, a smartphone, server-based (computing) equipment, a network controller or other type of network management device, etc. If desired, device 50 may be a network device (e.g., an initially un-provisioned network device). As shown in one illustrative example of FIG. 3, provisioning artifact analysis tool 56 may be implemented on network device 10 (instead of or in addition to being implemented on another computing device 50 external to network device 10). In this example, the operations of analysis tool 56 may be performed by processing circuitry 28 in FIG. 2 executing (software) instructions stored on memory circuitry 30 (e.g., processing circuitry 54, memory circuitry 58, and/or input-output circuitry 60 as described herein may be within network device 10).

In order to parse or otherwise process (encoded) provisioning artifact(s) 40 (e.g., the encoded content therein), computing device 50 may first receive provisioning artifact(s) 40 as stored and/or encoded by bootstrap server 20. As examples, computing device 50 may establish a wired connection directly to bootstrap server 20 (e.g., via a cable forming communication path 42) by which provisioning artifact(s) 40 (containing encoded content) is received from server 20, may establish a connection via a network (e.g., the Internet) to bootstrap server 20 (e.g., via a network path 42)

by which provisioning artifact(s) 40 (containing encoded content) is received from server 20, and/or may establish a connection (e.g., over a network path 44 or over a direct cable connection) to network device 10 by which provisioning artifact(s) 40 (containing encoded content) from server 20 is forwarded to computing device 50 via network device 10 (e.g., via path 16). Regardless of the manner in which path 42 or path 44 is implemented, computing device 50 may thereby obtain provisioning artifact(s) 40 (in an encoded form) via one of these paths. If desired, an external removable storage device may store encoded provisioning artifact(s) 40 downloaded from server 20 and computing device 50 may connect to the removable storage device (via input-output circuitry 60) to obtain encoded provisioning artifact(s) 40 stored thereon. In instances where network device 10 implements analysis tool 56, network device 10 (e.g., analysis tool 56 thereon) may receive encoded provisioning artifact(s) 40 from server 20 via path 16 (e.g., a connection via a network such as the Internet).

Configurations in which a bootstrap server is the source of provisioning information (e.g., of provisioning artifact(s) 40) from which analysis tool 56 obtains the encoded provisioning information are sometimes described herein as an illustrative example. If desired, analysis tool 56 may similarly obtain encoded provisioning information from other sources (e.g., a DHCP server, a removable storage device, etc.).

Figure 4:
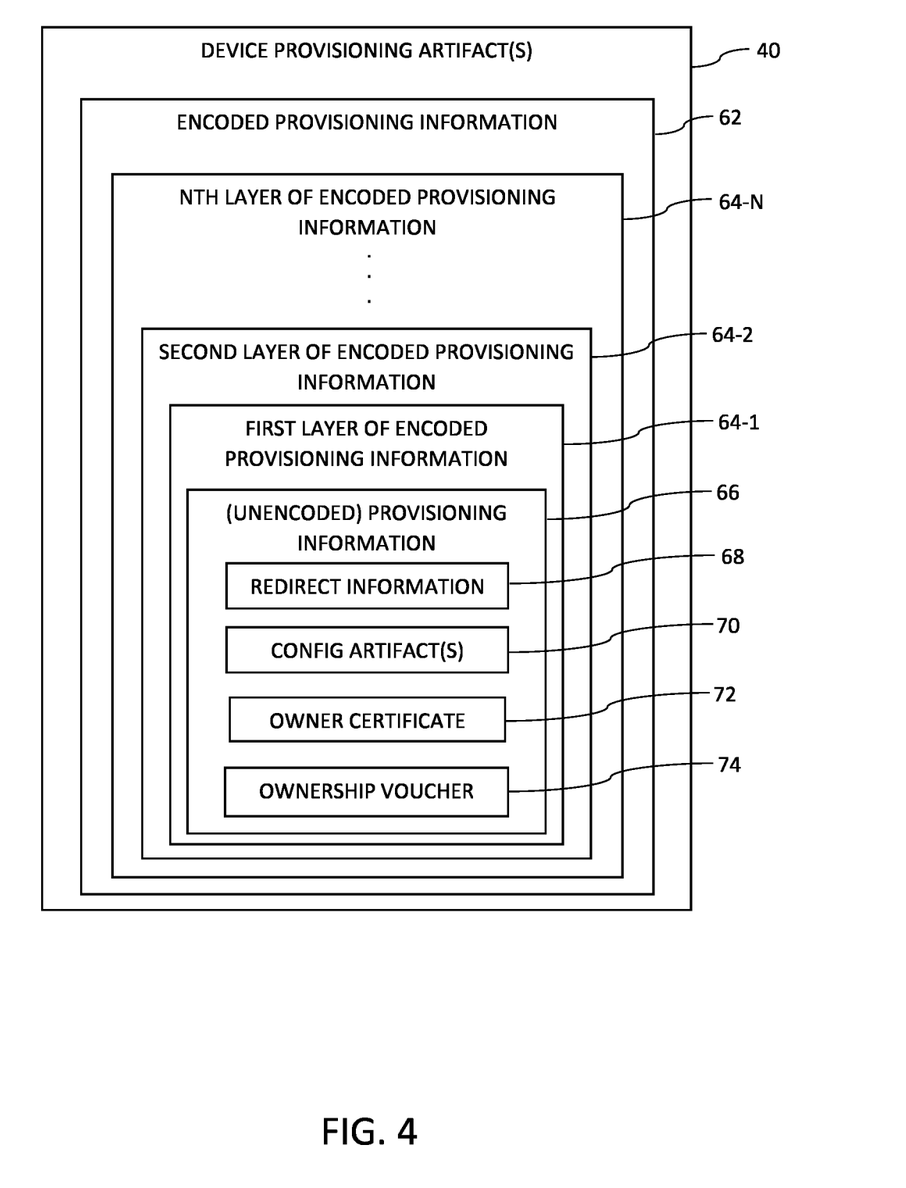
FIG. 4 is a diagram of illustrative device provisioning artifact(s) containing encoded provisioning information in accordance with some embodiments.

FIG. 4 is a diagram of illustrative network device provisioning artifact(s) such as provisioning artifact(s) 40 supplied by a source of device provisioning information (e.g., server 20 in FIG. 3) and received by network device 10 and/or by computing device 50 (FIG. 3). Provisioning artifact(s) 40 may include encoded content such as encoded provisioning information 62. Provisioning artifact(s) 40 may be contained within one or more network device provisioning files, as desired. In order not to obscure the present embodiments described herein, provisioning artifact(s) 40 and encoded provisioning information 62 therein are described sometimes herein to be contained within a single device provisioning file as an illustrative example. However, if desired, the provisioning information content (e.g., each provisioning artifact 40, subsets of provisioning artifact(s) 40, etc.) may be separated (e.g., separately encoded) into one or multiple provisioning files for conveyance to network device 10 and/or by computing device 50. Network device provisioning artifact(s) 40 may sometimes be referred to herein as encoded provisioning artifact(s) 40, provisioning artifact(s) 40 in an encoded form, or an encoded version of provisioning artifact(s) 40 because provisioning artifact(s) 40 includes encoded content.

In the example of FIG. 4, encoded provisioning information 62 may include content encoded with multiple layers of different types of encoding. In particular, (unencoded) provisioning information 66 may be encoded with a first layer of encoding (resulting in first encoded provisioning information 64-1), which may further be encoded with a second layer of encoding (resulting in second encoded provisioning information 64-2), which may further be encoded with one or more additional layers of encoding (resulting in Nth encoded provisioning information 64-N or the resulting encoded provisioning information 62). Any suitable number of layers of encoding (e.g., one, two, three, etc.) may be used. Configurations in which encoded provisioning information 62 includes at least three layers of encoding 64 are sometimes described herein as an example.

Each layer of encoding may include a corresponding modification of the underlying content (e.g., unencoded provisioning information or encoded provisioning information on which additional encoding is applied) to structure the underlying content to comply with a certain format. As examples, the desired format for each layer of encoding may be based on a file format (e.g., comply with a format of a JavaScript Object Notation (JSON) file, comply with a format of an Extensible Markup Language (XML) file, comply with a format of key-value pairs, etc.), based on a cryptographic format or structure (e.g., in compliance with a Cryptographic Message Syntax (CMS) structure), based on a specific encoding rule (e.g., ASN.1 encoding rules such as Distinguished Encoding Rules (DER), Canonical Encoding Rules (CER), and Basic Encoding Rules (BER)), and/or based on any other suitable formats.

While different types of content in unencoded (raw) provisioning information 66 (e.g., different types of provisioning artifacts, different types of configuration artifacts, etc.) are shown in FIG. 4 to have the same (type and layers of) encoding, this is merely illustrative. Different types of provisioning information content (e.g., different unencoded provisioning artifacts, different encoded configuration artifacts, etc.) may be encoded in different formats (e.g., to comply with different file formats for the different types of content, to comply with a cryptographic structure depending on the type of content, using different types of encoding schemes depending on the type of content) and/or encoded using different numbers of layers of encoding. If desired, some types of provisioning information content (e.g., some of the different unencoded provisioning artifacts, some of the different encoded configuration artifacts, etc.) may be encoded in the same manner and/or encoded using the same number of layers of encoding. As an illustrative example, the types of encoding applied to raw provisioning information 66 to generate one or more encoded provisioning artifacts(s) 40 may comply with the encoding schemes specified in RFC 8572, or other standards. While provisioning information 66 is sometimes described herein to be raw provisioning information, there may still be a default format to each type of provisioning information 66. The layers of encoding 64 may be applied to raw provisioning information 66 in these default formats.

In the example of FIG. 4, raw provisioning information 66 (e.g., raw provisioning artifacts or raw provisioning artifact content) may include redirect information 68 or configuration artifact(s) 70, and validation information for the provisioning information such as owner certificate 72 and ownership voucher 74. Whereas redirect information 68 may specify locations (e.g., network addresses) of other sources of provisioning information, configuration artifact(s) 70 may specify executable files and/or configuration data (e.g., parameters, values, states, etc.) directly processed (e.g., executed and stored) by a network device to perform self-provisioning. These types of provisioning information 66 are merely illustrative. If desired, other types of information may be encoded in addition to or instead of those described above in connection with provisioning information 66.

Processing circuitry 54 in FIG. 3 (or processing circuitry 28 in FIG. 2) on which analysis tool 56 is implemented may obtain device provisioning artifact(s) 40 containing encoded provisioning information 62 as described in connection with FIG. 4. Processing circuitry 54 may store the obtained device provisioning artifact(s) 40 on memory circuitry 58 (FIG. 3) and/or generally provide access to device provisioning artifact(s) 40 accessible by analysis tool 56.

Figure 5:
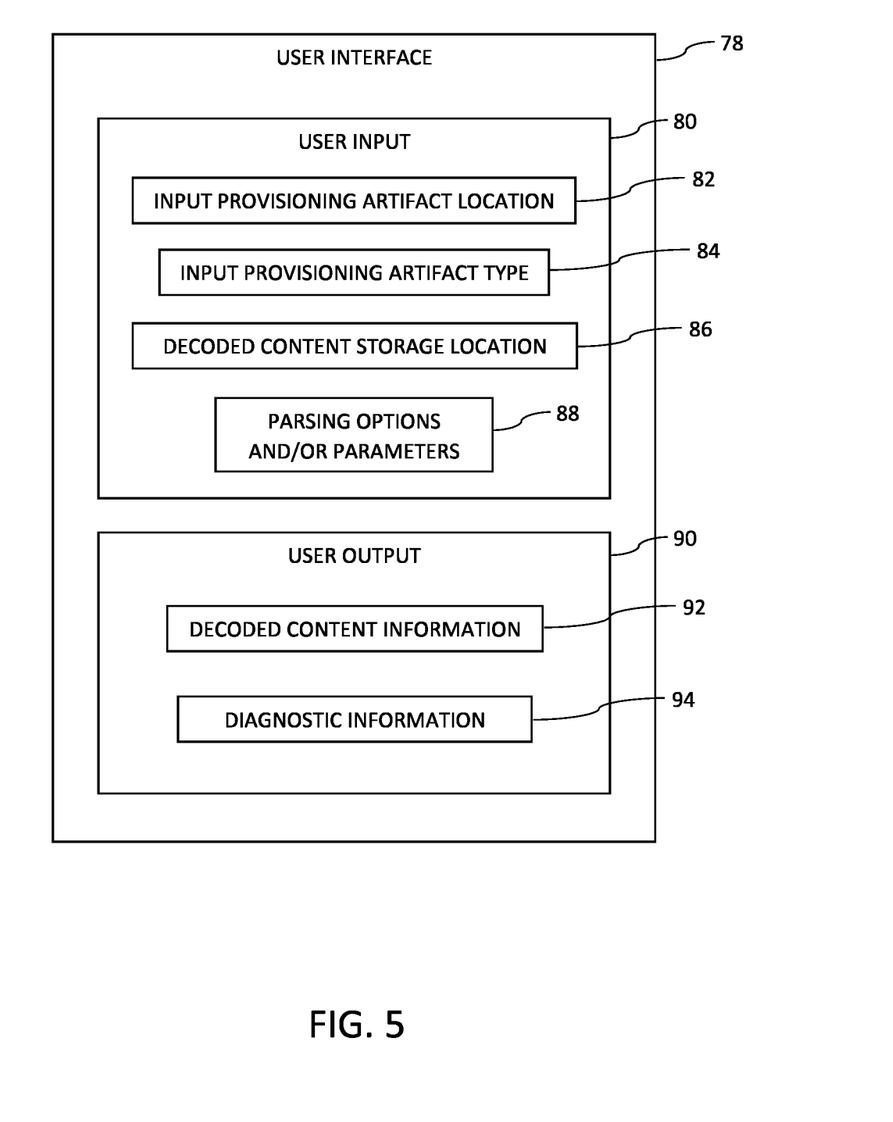
FIG. 5 is a diagram of an illustrative user interface by which user input can be received by the analysis tool and/or by which the analysis tool can provide user output in accordance with some embodiments.

Once device provisioning artifact(s) 40 are accessible to analysis tool 56, processing circuitry 54 may await user input before processing the provisioning artifact(s) 40 containing encoded content and/or presenting user output based on the processing. FIG. 5 is a diagram of an illustrative user interface such as user interface 78 provided at computing device 50 (FIG. 3) to facilitate user interactions with provisioning artifact analysis tool 56 implemented on processing circuitry 54.

In some illustrative configurations described herein as an example, processing circuitry 54 may provide a command line interface based on which user interface 78 is implemented. In particular, the user can supply input via input-output devices of circuitry 60 in FIG. 3 (e.g., via a touch-screen display, a keyboard, a mouse, a touchpad or trackpad, etc.) as user commands to the command line interface. Analogously, the command line interface may supply output that is presented to the user via input-output devices of circuitry 60 in FIG. 3. As an example, output from the command line interface may be presented on a display for viewing by the user.

The use of a command line interface to facilitate user interactions with analysis tool 56 is merely illustrative. If desired, other types of interfaces such as a graphical user interface, an application programming interface, etc., may be used to facilitate user interactions with analysis tool 56 (e.g., supply user commands or user input to analysis tool 56 and/or convey information for output to the user). As described herein, user interface 78 may include the software interfaces implemented by processing circuitry 54 (e.g., a command line interface, a graphical user interface, an application programming interface, etc.) and the input-output devices by which the user physically interacts to supply input and receive output.

Illustrative user input information 80 that may be specified to issue commands and/or other user input to processing circuitry 54 (e.g., analysis tool 56 executed thereon) are described in connection with FIG. 5, as an example. In the example of FIG. 5, an illustrative command supplied to processing circuitry 54 may include a file location 82 on memory circuitry 58 (e.g., a file path) of the stored input (encoded) provisioning artifact(s) 40 for parsing, testing, and/or analysis, may include a content type 84 of the input (encoded) provisioning artifact(s) 40 (e.g., information indicative of the content or artifact types in provisioning artifact(s) 40 such as information indicative of whether provisioning artifact(s) 40 contain redirect information or (onboarding) configuration information, information indicative of whether or not provisioning artifact(s) 40 contain validation information, information indicative of whether configuration artifacts in provisioning artifact(s) 40 contain a pre-configuration script, configuration data, and/or a post-configuration script, information indicative of one or more standards such as RFC 8572 with which provisioning artifact(s) 40 are in compliance, etc.), may include one or more file locations 86 on memory circuitry 58 (e.g., file paths) or generally location information (e.g., a file directory or a folder location) indicative of locations 86 at which content (e.g., for corresponding provisioning artifact(s)) decoded from encoded provisioning artifact(s) 40 is stored, and/or may include additional parsing options 88 and accompanying parsing parameters (if used).

In the absence of additional parsing options 88, a default command specifying encoded provisioning artifact location 82, encoded provisioning artifact (content) type 84, and decoded (artifact) content storage location 86 supplied to user interface 78 may cause processing circuitry 54 (e.g., analysis tool 56) to parse the encoded provisioning artifact(s) 40 stored at location 82 (e.g., decode the corresponding number of layers of encoding 64 for one or more provisioning files containing encoded provisioning artifact(s) 40) and to store corresponding decoded artifact-based content at specified location(s) 86. If desired, decoded artifact-based content may include at least some of raw provisioning information 66 (FIG. 4), may omit at least some of raw provisioning information 66, and/or may include parsed (e.g., altered) versions of raw provisioning information 66.

As a first example, when encoded provisioning artifact(s) 40 include redirect information 68 (FIG. 4) as raw provisioning information 66 (e.g., as a redirect information provisioning artifact), processing circuitry 54 may decode encoded provisioning artifact(s) 40 and store redirect information 68 at location 86 (e.g., within a file directory or folder location used to specify location 86).

As a second example, when encoded provisioning artifact(s) 40 include configuration artifacts 70 as raw provisioning information 66 (e.g., as an onboarding information provisioning artifact), processing circuitry 54 may decode encoded provisioning artifact(s) 40 and store functional sections of configuration artifacts 70 (e.g., different configuration artifacts) separately at corresponding locations 86 (e.g., different locations within the same file directory or folder location used to specify locations 86). The separated functional sections may include separate executable files to be executed as part of network device provisioning and/or may include a set of configuration data (e.g., networking data, boot image information, configuration parameters, etc.) to be stored as part of network device provisioning. This separation into functional sections is merely illustrative.

As a third example, when encoded provisioning artifact(s) 40 include owner certificate 72 and ownership voucher 74 as raw provisioning information 66 (e.g., as an owner certificate provisioning artifact and as an ownership voucher provisioning artifact), processing circuitry 54 may decode encoded provisioning artifact(s) 40 and store, at location 86, a certificate (e.g., a pinned-domain certificate, a root certificate, a certificate used to verify owner certificate 72, etc.) extracted from ownership voucher 74 and, if desired, not directly store owner certificate 72 and ownership voucher 74 as extracted.

These examples are merely illustrative. If desired, other types of default parsing (e.g., decoding) schemes may be employed by processing circuitry 54 (e.g., analysis tool 56).

As part of the parsing operation performed by analysis tool 56, processing circuitry 54 may process signed, encrypted, and/or generally secure (e.g., signed and/or encrypted as part of one or more layers of encoding) provisioning information 66 in provisioning artifact(s) 40 such as secure (e.g., signed and/or encrypted) redirect information 68 or secure (e.g., signed and/or encrypted) configuration artifact(s) 70. The secure information may be signed and/or encrypted using an owner certificate. Processing circuitry 54, as part of the parsing operation, may validate the secure version of provisioning information 66. As part of the validation process, processing circuitry 54 may authenticate ownership voucher 74 (decoded from encoded provisioning artifact(s) 40) by validating the signature of ownership voucher 74 based on one of the pre-configured and/or user input (as part of user input information 80) trust anchor certificate(s). The trust anchor certificate(s) may be stored internally on memory circuitry 58 (FIG. 3) for access and use by analysis tool 56 or generally stored at a trusted storage device accessible by processing circuitry 54 (e.g., by analysis tool 56 thereon). If desired, the trust anchor certificate may be provided as part of user input 80 (e.g., as part of a parsing option 88 or a corresponding parsing parameter).

Upon successful authentication of ownership voucher 74, processing circuitry 54 may extract a certificate (e.g., an X.509 certificate, a pinned-domain certificate, a root certificate, etc.) from ownership voucher 74. Processing circuitry 54 may further validate owner certificate 72 based on the extracted certificate (e.g., by performing an X.509 certificate path verification to the extracted certificate). Processing circuitry 54 may then verify that the secure version of provisioning information 66 was signed and/or encrypted by the validated owner certificate 72.

The inclusion of options 88 in the user command or input to the user interface 78 may expand the testing capabilities of analysis tool 56. Possible options 88 may include an option to bypass signature verification of provisioning information 66. For example, user input information 80 may further include, as a parsing parameter, appropriate validation information (e.g., certificates, vouchers, etc.) to ensure successful verification and/or decoding of the secure version of redirect information or configuration artifacts regardless of the actual validation information encoded in provisioning artifact(s) 40. Possible options 88 may include an option to override a root or pinned-domain certificate that would otherwise have been extracted from ownership voucher 74. For example, user input information 80 may further include, as a parsing parameter, the appropriate certificate to verify owner certificate 72 to ensure successful verification and/or decoding of owner certificate 72 regardless of the actual ownership voucher 74 encoded in provisioning artifact(s) 40. Possible options 88 may include an option to override owner certificate 72. For example, user input information 80 may further include, as a parsing parameter, the appropriate owner certificate to ensure successful verification and/or decoding of the secure version of redirect information or configuration artifacts and/or to be verifiable by a root or pinned-domain certificate extracted from ownership voucher 74, regardless of the actual owner certificate 72 encoded in provisioning artifact(s) 40. If desired, options 88 may similarly override ownership voucher 74 (e.g., provide an appropriate ownership voucher substituting for ownership voucher 74 in encoded provisioning artifact(s) 40 during the parsing operation) and/or provide an appropriate manufacturer's voucher signing certificate (e.g., usable to validate the signature of ownership voucher 74).

As illustrated using the examples for options 88 described above, options 88 may provide a mechanism by which one or more pieces of information that is known to be appropriate or correct are used as substitutes with corresponding information encoded in provisioning artifact(s) 40 during the parsing process performed by processing circuitry 54. This may be helpful in determining whether or not any issues lie in the substituted information (e.g., when parsing succeeds when the information is substituted by option(s) 88 but fails when the information is not substituted) and/or guarantee the extraction of decoded content for examination and analysis (without the need to account for improper signing, encrypting, encoding, and/or other variables). In other words, this may guarantee the generation of error diagnostic information for the provisioning artifacts (e.g., redirect information or configuration artifacts) themselves.

If desired, the degree and/or requirements of parsing may also be specified as one or more options 88. As an example, possible options 88 may include an option to disable strict parsing that would have been performed when a network device processes encoded provisioning artifact(s) 40. Disabling strict parsing may relax (e.g., reduce) certain formalities or requirements such as date format requirements and generally data format requirements where multiple different representations or versions of the same data are possible. If desired, possible options 88 may include an option to re-encode the decoded provisioning artifacts with one or more encoding schemes (e.g., the desired encoding schemes being indicated as part of the user command as parsing parameters). If desired, possible options 88 may include an option to substitute one or more actual provisioning artifacts in the received set of provisioning artifacts (e.g., replace ownership voucher 74 in FIG. 4 with another ownership voucher, replace owner certificate 72 in FIG. 4 with another owner certificate, replace one or more configuration artifacts 70 in FIG. 4 with other configuration artifact(s), replace redirect information 68 in FIG. 4 with other redirect information). File locations of the replacement provisioning artifact(s) may be provided as part of the user command as parsing parameters. If desired, processing circuitry 54 (e.g., analysis tool 56) may be configured to receive and process other types of options (and accompanying parameters or arguments such as files, certificates, etc.).

A user input command may use any suitable combination of options 88 to alter the default parsing behavior of analysis tool 56. If desired, multiple different user input commands specifying the same set of encoded provisioning artifact(s) 40 may be received and processed by analysis tool 56 to test and debug different parts of provisioning artifact(s) 40 (e.g., using different sets of options 88).

Processing circuitry 54 may provide, as output (e.g., as user output presented to a user via user interface 78), any suitable types of information resulting from or based on the parsing operation performed on encoded provisioning artifact(s) 40. In the example of FIG. 5, output information 90 presented to a user may include decoded content information 92 (e.g., one or more decoded artifacts, decoded artifact-based content, etc.). In particular, information 92 may include any information indicative of the decoded provisioning information 66 extracted from encoded provisioning artifact(s) 40. As an example, decoded content information 92 may include an indication (e.g., a name or identifier) of each piece of content extracted from encoded provisioning artifact(s) 40, locations (e.g., file paths) of the extracted pieces of content (e.g., provisioning artifacts themselves or generally artifact-based content) as stored on memory circuitry 58 (FIG. 3), the content type (e.g., artifact type) of extracted content being stored at each location (e.g., executable file, configuration data, certificate, etc.), the format and/or encoding of the extracted content being stored at each location (e.g., some layers of encoding or format may remain even after the parsing operation performed by analysis tool 56), and/or any other suitable information associated with the decoded content.

If desired, processing circuitry 54 may keep a record of processing activities or operations performed to parse encoded provisioning artifact(s) 40. These processing operations may include file format conversions, decryption operations, certificate validation operations, signature verification operations, as just a few examples. As part of user output information 90, user interface 78 may provide diagnostic information 94 such as the record of performed processing operations, which includes timestamps and/or duration of each processing operation, actions performed as part of each processing operation, content stored as part of each processing operation, whether or not each processing operation was successfully completed, one or more points at which processing failed (e.g., at which parts of provisioning artifact(s)

40 did processing fail, at which type of operation did the processing of provisioning artifact(s) 40 fail, etc.), and/or any other suitable information usable to provide details of the operations of analysis tool 56. If desired, diagnostic information 94 may be presented as output based on an option 88 (e.g., an option 88 may be to toggle whether or not diagnostic information 94 is presented to a user).

The illustrative input information 80 to be received by processing circuitry 54 via user interface 78 for processing and the illustrative output information 90 for output by processing circuitry 54 via user interface 78 as described in connection with FIG. 5 are merely illustrative. If desired, other suitable types of user input information may be received for processing and/or other suitable types of user output information may be presented to a user.

Figure 6:
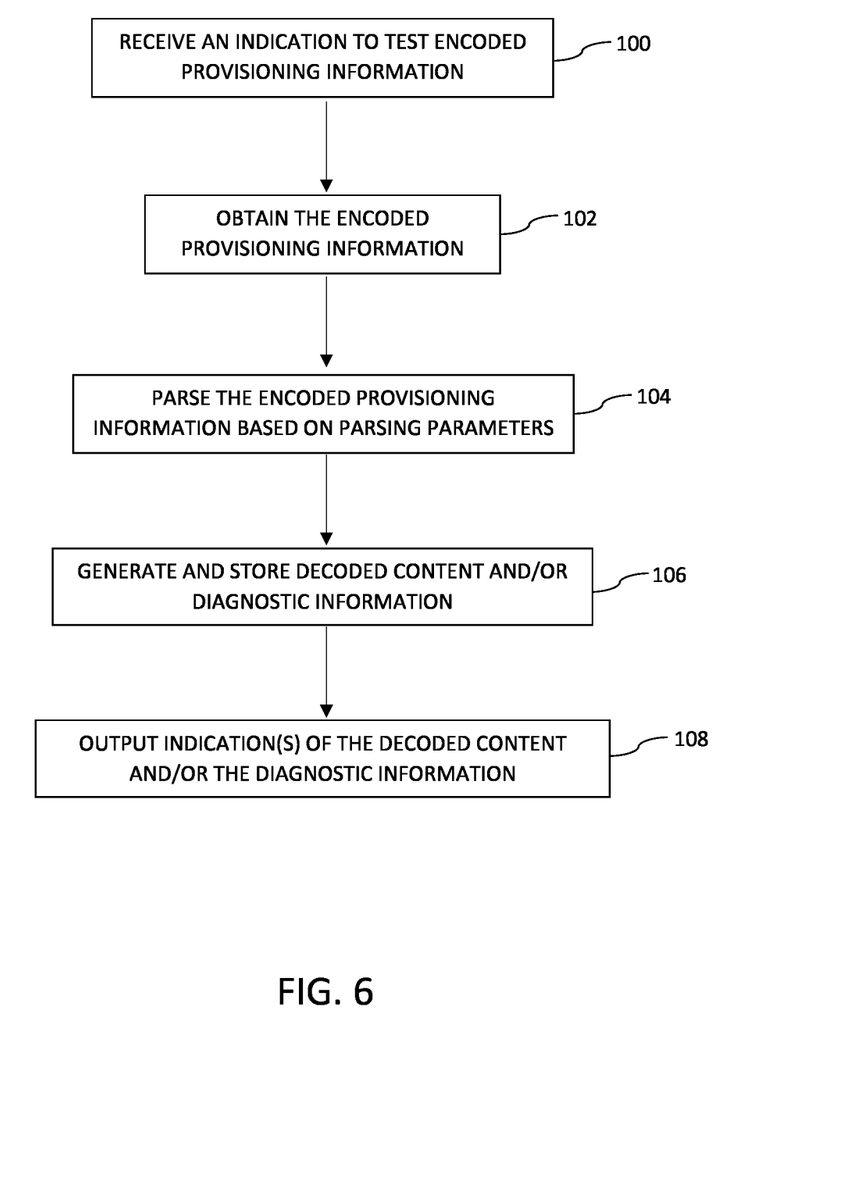
FIG. 6 is a flowchart of illustrative operations for operating an analysis tool for encoded provisioning information in accordance with some embodiments.

FIG. 6 is a flowchart of illustrative operations for parsing encoded network device provisioning information (e.g., as contained within one or more provisioning files with encoded provisioning artifact(s) 40 of the type described in connection with FIG. 4). These operations may be performed by one or more processors implementing a provisioning information analysis tool (e.g., analysis tool 56 in FIG. 3) such as by processing circuitry 54 in computing device 50 and/or by processing circuitry 28 in network device 10. The illustrative operations described in connection with FIG. 6 may generally be performed by processing circuitry 54 and/or 28 by executing software instructions stored on memory circuitry 58 and/or 30. If desired, one or more operations described in connection with FIG. 6 may be performed by other dedicated hardware components in device 50 and/or device 10. In an illustrative configuration described herein as an example, the operations described in connection with FIG. 6 may be performed by analysis tool 56 and corresponding (user and/or programming) interface(s) for analysis tool 56, or generally by processing circuitry 54 on which they are implemented. If desired, these operations may similarly be performed by processing circuitry 28 implementing analysis tool 56 and corresponding (user and/or programming) interface(s) for analysis tool 56.

At block 100, processing circuitry 54 (e.g., a user interface, an application programming interface, etc.) may receive an indication to test encoded network device provisioning information (e.g., encoded provisioning artifact(s) 40 in FIG. 4). As an example, the indication may be received from a user (e.g., via user interface 78 in FIG. 5) and may include a corresponding user command or other input. As another example, the indication may be received by the processing circuitry 54 from external equipment (e.g., server 20, device 10, etc.) via an interface (e.g., an application programming interface) and may be indicative of the encoded provisioning information being faulty, failure to provision a network device based on the encoded provisioning Information, etc.

At block 102, processing circuitry 54 (e.g., analysis tool 56) may obtain encoded provisioning information (e.g., in one or more encoded provisioning files containing provisioning artifact(s) 40) based on the indication received at block 100. The indication (e.g., user command) may include a location on the memory circuitry of computing device 50 at which the encoded provisioning information is stored, a location (e.g., a network address) from which the encoded provisioning information is to be obtained, and/or generally information based on which the encoded provisioning information can be obtained or accessed. Processing circuitry 54 may obtain the encoded provisioning information from the indicated location and/or information.

At block 104, processing circuitry 54 (e.g., analysis tool 56) may parse the encoded provisioning information. In scenarios in which user input specifies default parsing parameters for the parsing operation (e.g., no additional options 88 in FIG. 5 are received by processing circuitry 54), processing circuitry 54 may extract and format decoded content in a predetermined manner based on the encoded provisioning information. In scenarios in which user input specifies additional parsing parameters (e.g., includes additional options 88), modifications such as those described in connection with options 88 in FIG. 5 can be made to the parsing operation.

At block 106, processing circuitry 54 (e.g., analysis tool 56) may generate and store decoded (artifact-based) content and/or diagnostic information. As an example, processing circuitry 54 may parse the encoded provisioning information to generate separate pieces of decoded content or separate functional sections of provisioning information (e.g., generate the provisioning artifact itself, generate decoded content extracted based on the provisioning artifact, etc.). These pieces of decoded content may be stored at locations specified in a user command or may be stored at default locations. During the parsing operation, processing circuitry 54 may also generate and store a detailed record or log of activities performed as part of the parsing operation, activity timestamps, and/or other information (e.g., whether each activity was successfully completed, what types of error(s) were encountered during each activity, etc.) as diagnostic information.

At block 108, processing circuitry 54 (e.g., a user interface, an application programming interface, etc.) may output indication(s) of the decoded content and/or diagnostic information. As examples, the indications of decoded content may include types of content extracted from the encoded provisioning information, the location(s) at which the extracted content is stored, the decoded content itself, and/or any other characteristics of the decoded content. Processing circuitry 54 may present (output) these indications of decoded content to a user using a display or other types of input-output devices. If desired, processing circuitry 54 may present (output) diagnostic information to a user using the display or other types of input-output devices.

Figure 7:
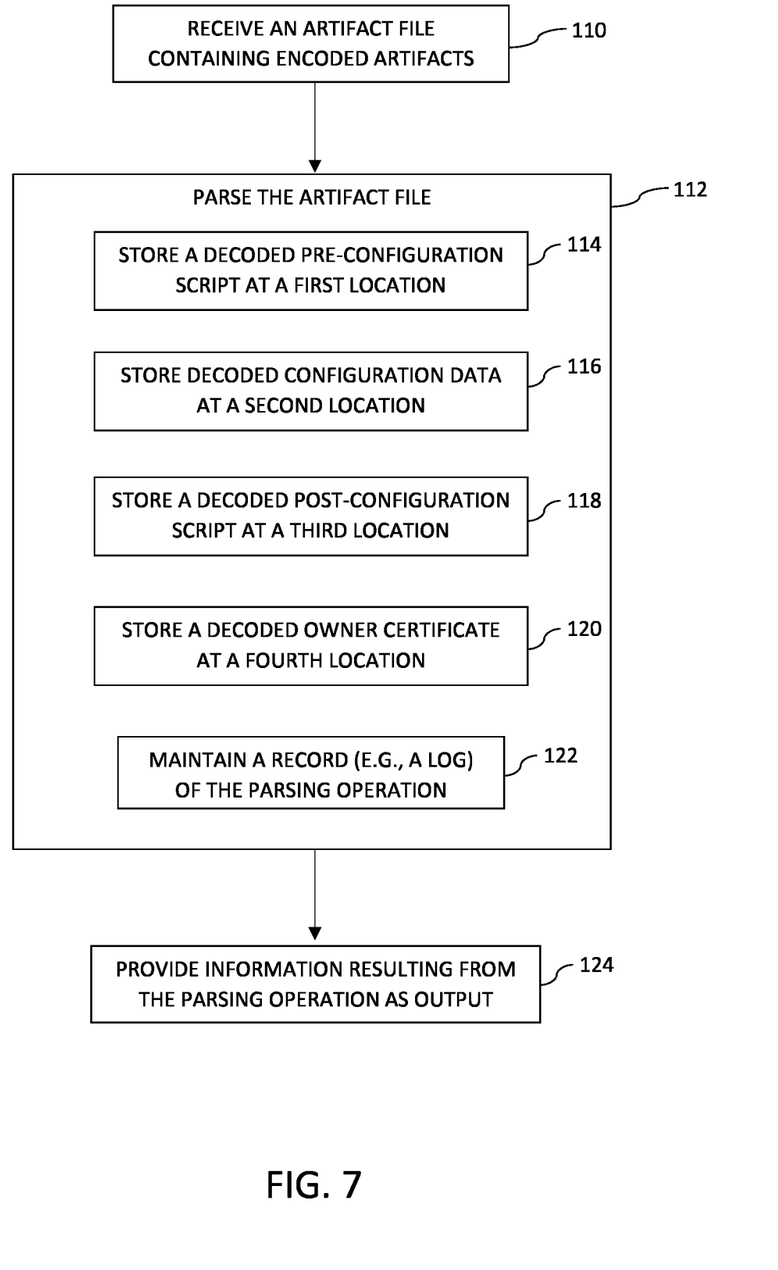
FIG. 7 is a flowchart of illustrative operations for parsing an artifact file containing encoded artifacts in accordance with some embodiments.

FIG. 7 is a flowchart of illustrative operations for parsing one or more encoded provisioning artifacts (e.g., an artifact file containing one or more encoded provisioning artifact(s) 40 in FIG. 4, an artifact file for secure zero touch provisioning, and/or an artifact file containing content in compliance with RFC 8572). These operations may be performed by one or more processors implementing a provisioning artifact analysis tool (e.g., analysis tool 56 in FIG. 3) such as by processing circuitry 54 in computing device 50 and/or by processing circuitry 28 in network device 10. The illustrative operations described in connection with FIG. 7 may generally be performed by processing circuitry 54 and/or 28 by executing software instructions stored on memory circuitry 58 and/or 30. If desired, one or more operations described in connection with FIG. 7 may be performed by other dedicated hardware components in device 50 and/or device 10. In an illustrative configuration described herein as an example, the operations described in connection with FIG. 7 may be performed by analysis tool 56 and corresponding (user and/or programming) interface(s) for analysis tool 56, or generally by processing circuitry 54 on which they are implemented. If desired, these operations may similarly be performed by processing circuitry 28 implementing analysis tool 56 and corresponding (user and/or programming) interface(s) for analysis tool 56.

At block 110, processing circuitry 54 (e.g., a user interface, an application programming interface, etc.) may receive an artifact file containing encoded provisioning artifacts (e.g., artifacts in compliance with RFC 8572). As examples, the artifact file may be stored locally on computing device 50 and obtained from memory circuitry 58 of computing device 50 and/or may be downloaded from an external source such as a server, a network device, or a removable storage device.

At block 112, processing circuitry 54 (e.g., analysis tool 56) may parse the artifact file. As part of the parsing operation, processing circuitry 54 (e.g., analysis tool 56) may extract and store a decoded pre-configuration script at a first location on memory circuitry 58 in FIG. 3 (at block 114), may extract and store decoded configuration data at a second location on memory circuitry 58 (at block 116), may extract and store a decoded post-configuration script at a third location on memory circuitry 58 (at block 118), may extract and store a decoded owner certificate (and/or a pinned domain certificate) at a fourth location on memory circuitry 58 (at block 120). The extraction and storage of these pieces of content may be determined by a user command as described in connection with user input information 80 in FIG. 5.

As part of the parsing operation, processing circuitry 54 may also maintain (e.g., store and update) a record or log of actions or activities performed as part of the parsing operation in block 112 (at block 122). This record may form part of the diagnostic information described in connection with FIGS. 5 and 6.

At block 124, processing circuitry 54 (e.g., a user interface, an application programming interface, etc.) may provide information resulting from the parsing operation as output. The output may be provided as user output via a user interface and/or may be provided as output to external systems (e.g., a server, a network device, administrator device, etc.). The output information may include the types of extracted content (e.g., a pre-configuration script, configuration data, a post-configuration script, an owner certificate and/or a pinned domain certificate, etc.), the locations at which the extracted content is stored (e.g., the first, second, third, and fourth locations within the same file directory or folder location and/or within different file directories or folder locations), and/or any other contextual information for the extracted content. The output information may include a detailed record of the parsing operation that is performed (e.g., activities performed, which, if any, part of the parsing operation was not successfully completed, etc.).

The operations described in connection with each of FIGS. 6 and 7 are merely illustrative. If desired, one or more of these operations within any of FIGS. 6 and 7 may be omitted and/or changed. If desired, one or more additional operations may be performed in addition to the operations described in connection with any of FIGS. 6 and 7. If desired, the order of the operations described in connection with any of FIGS. 6 and 7 may be changed. If desired, some operations described in connection with each of FIGS. 6 and 7 may be performed in parallel with each other (e.g., across multiple components such as across multiple processors of network device 10 and/or computing device 50) and/or some operations described in connection with each of FIGS. 6 and 7 may be performed sequentially (e.g., at only a single component such as at a processor of network device 10, at only a single component such as at a processor of network device 50, etc.).

The methods and operations described above in connection with FIGS. 1-7 may be performed by the components of one or more network devices, one or more computing devices, and/or one or more servers or other host equipment using software, firmware, and/or hardware (e.g., dedicated circuitry or hardware). Software code for performing these operations may be stored on one or more non-transitory computer-readable storage media (e.g., tangible computer readable storage media) on one or more of the components of the network device(s), the computing device(s), and/or the server(s) or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s), the computing device(s) and/or the server(s) or other host equipment (e.g., processing circuitry 28 in network device 10, processing circuitry 54 in computing device 50, etc.).

The foregoing is merely illustrative and various modifications can be made to the described embodiments. The foregoing embodiments may be implemented individually or in any combination.

What is claimed is:

1. A computing device comprising:
input-output circuitry;
memory circuitry; and
processing circuitry coupled to the memory circuitry and the input-output circuitry and configured to:
 receive input indicating one or more encoded network device provisioning artifacts for parsing;
 obtain decoded network device provisioning information by parsing the one or more encoded network device provisioning artifacts, wherein the decoded network device provisioning information comprises redirect information indicative of a source of a configuration artifact for performing network device provisioning;
 store the decoded network device provisioning information at the memory circuitry; and
 output one or more indications of the decoded network device provisioning information via the input-output circuitry.

2. The computing device defined in claim 1, wherein the processing circuitry and the input-output circuitry form a user interface, wherein the received input comprises a user command received via the user interface, and wherein the one or more indications of the decoded network device provisioning information are output via the user interface.

3. The computing device defined in claim 1, wherein the received input includes an option to modify the parsing of the one or more encoded network device provisioning artifacts.

4. The computing device defined in claim 3, wherein the option overrides a portion of the one or more encoded network device provisioning artifacts and includes content that is used in parsing the one or more encoded network device provisioning artifacts instead of the portion of the one or more encoded network device provisioning artifacts.

5. The computing device defined in claim 4, wherein the content comprises validation information.

6. The computing device defined in claim 1, wherein the processing circuitry is configured to output a record of activities performed when parsing the one or more encoded network device provisioning artifacts.

7. The computing device defined in claim 6, wherein the record of activities comprises indications of whether or not each of the activities was successfully completed.

8. The computing device defined in claim 1, wherein the redirect information comprises one or more network addresses of a bootstrap server.

9. The computing device defined in claim 1, wherein the computing device is a network device, the input-output circuitry comprises network interfaces, and the computing device further comprises one or more packet processors coupled to the network interfaces.

10. The computing device defined in claim 1, wherein the one or more indications that are output comprise a location on the memory circuitry that stores the decoded network device provisioning information.

11. One or more non-transitory computer-readable storage media comprising computer-executable instructions that, when executed by one or more processors for a computing device, cause the one or more processors to:
receive a user command comprising a file location of an encoded network device provisioning file, location information indicative of one or more additional file locations at which decoded content is to be stored, and a parsing option to modify parsing of the encoded network device provisioning file that extracts the decoded content;
obtain the decoded content based on the user command;
store the decoded content at the one or more additional file locations; and
provide a report of the parsing of the encoded network device provisioning file as user output.

12. The one or more non-transitory computer-readable storage media defined in claim 11, wherein the report of the parsing of the encoded network device provisioning file comprises actions performed as part of the parsing, time information of the actions, and whether or not the actions were successfully completed.

13. The one or more non-transitory computer-readable storage media defined in claim 11 further comprising computer-executable instructions that, when executed by the one or more processors for the computing device, cause the one or more processors to:
provide each of the one or more additional file locations as user output, wherein the location information comprises a folder location and wherein the one or more additional file locations are located within the folder location; and
provide a type of content stored at each of the one or more additional file locations as user output.

14. The one or more non-transitory computer-readable storage media defined in claim 11, wherein the parsing option comprises substitute validation information for ensuring successful validation of one or more parts of the encoded network device provisioning file.

15. The one or more non-transitory computer-readable storage media defined in claim 11, wherein the parsing option relaxes one or more requirements relative to a default parsing of the encoded network device provisioning file that occurs during a network device provisioning operation.

16. A computing device comprising:
input-output circuitry;
memory circuitry; and
processing circuitry coupled to the memory circuitry and configured to:
obtain an artifact file having one or more encoded artifacts for network device provisioning;
obtain pieces of decoded content usable to provision a network device by parsing the artifact file, wherein the pieces of decoded content comprise configuration data to be stored by the network device for network device provisioning;
store the pieces of decoded content at the memory circuitry; and
output information indicative of each of the pieces of decoded content via the input-output circuitry.

17. The computing device defined in claim 16, wherein the pieces of decoded content further comprise a pre-configuration script executable by the network device for network device provisioning or a post-configuration script executable by the network device for network device provisioning.

18. The computing device defined in claim 17, wherein the output information comprises a first location on the memory circuitry at which the pre-configuration script is stored, a second location on the memory circuitry at which the configuration data is stored, and a third location on the memory circuitry at which the post-configuration script is stored.

19. The computing device defined in claim 16, wherein the one or more encoded artifacts comprise onboarding information, an owner certificate, or an ownership voucher.

20. The computing device defined in claim 19, wherein the processing circuitry is configured to obtain a certificate from the ownership voucher by parsing the artifact file, store the certificate at the memory circuitry, and output information indicative of the certificate via the input-output circuitry.

* * * * *